US011833788B2

United States Patent
Bochnia et al.

(10) Patent No.: US 11,833,788 B2
(45) Date of Patent: Dec. 5, 2023

(54) METHOD FOR PRODUCING A MULTI-LAYER SUBSTRATE

(71) Applicant: HENKEL AG & CO. KGAA, Duesseldorf (DE)

(72) Inventors: Roland Bochnia, Hilden (DE); Stefan Strenger, Heiligenhaus (DE); Rainer Bongers, Frankfurt (DE); Mario Eckers, Wegberg (DE)

(73) Assignee: HENKEL AG & CO, KGaA, Duesseldorf (DE)

( * ) Notice: Subject to any disclaimer, the term of this patent is extended or adjusted under 35 U.S.C. 154(b) by 0 days.

(21) Appl. No.: 16/988,812

(22) Filed: Aug. 10, 2020

(65) Prior Publication Data
US 2020/0369010 A1   Nov. 26, 2020

Related U.S. Application Data

(63) Continuation of application No. PCT/EP2019/053056, filed on Feb. 7, 2019.

(30) Foreign Application Priority Data

Feb. 16, 2018   (EP) ..................................... 18157071

(51) Int. Cl.
*B32B 27/08* (2006.01)
*B32B 7/12* (2006.01)
(Continued)

(52) U.S. Cl.
CPC ................ *B32B 27/08* (2013.01); *B32B 3/06* (2013.01); *B32B 3/18* (2013.01); *B32B 5/16* (2013.01);
(Continued)

(58) Field of Classification Search
CPC .. B32B 27/08; B32B 3/06; B32B 3/18; B32B 5/16; B32B 7/05; B32B 7/12; B32B 27/10; B32B 27/306; B32B 29/04; B32B 37/00; B32B 37/12; B32B 37/1292; B32B 37/142; B32B 29/005; B32B 2037/243;
(Continued)

(56) References Cited

U.S. PATENT DOCUMENTS 2,147,689 A   2/1939 Chaffee
2,998,501 A   8/1961 Edberg et al.
(Continued)

FOREIGN PATENT DOCUMENTS

AT   VE990023 A1   11/2000
CA   2145938 A1   10/1995
(Continued)

OTHER PUBLICATIONS

Popil, Roman E. et aL "Adhesive level effect on corrugated board strength—experiment and FE modeling." In: International progress in paper physics seminar. Oxford, Ohio: Miami University, 2006.
(Continued)

*Primary Examiner* — Francisco W Tschen
*Assistant Examiner* — Abhishek A Patwardhan
(74) *Attorney, Agent, or Firm* — Sun Hee Lehmann

(57) ABSTRACT

The present invention relates to a method for producing a multi-layer substrate, said substrate comprising a multifunctional coating, and to the use of the substrate produced by this method.

12 Claims, 1 Drawing Sheet

(51) Int. Cl.

| | | |
|---|---|---|
| *B32B 27/10* | (2006.01) | |
| *B32B 27/30* | (2006.01) | |
| *B32B 37/12* | (2006.01) | |
| *B32B 37/00* | (2006.01) | |
| *B32B 37/14* | (2006.01) | |
| *B65D 81/03* | (2006.01) | |
| *B32B 3/06* | (2006.01) | |
| *B32B 3/18* | (2006.01) | |
| *B32B 5/16* | (2006.01) | |
| *B32B 7/05* | (2019.01) | |
| *B32B 29/04* | (2006.01) | |
| *B32B 37/24* | (2006.01) | |
| *B32B 29/00* | (2006.01) | |

(52) U.S. Cl.
CPC .......... *B32B 7/05* (2019.01); *B32B 7/12* (2013.01); *B32B 27/10* (2013.01); *B32B 27/306* (2013.01); *B32B 29/04* (2013.01); *B32B 37/00* (2013.01); *B32B 37/12* (2013.01); *B32B 37/1292* (2013.01); *B32B 37/142* (2013.01); *B65D 81/03* (2013.01); *B32B 29/005* (2013.01); *B32B 2037/243* (2013.01); *B32B 2255/10* (2013.01); *B32B 2255/12* (2013.01); *B32B 2255/26* (2013.01); *B32B 2264/303* (2020.08); *B32B 2305/30* (2013.01); *B32B 2307/56* (2013.01); *B32B 2310/0454* (2013.01); *B32B 2310/0825* (2013.01); *B32B 2323/04* (2013.01); *B32B 2331/04* (2013.01); *B32B 2439/06* (2013.01); *B32B 2439/46* (2013.01); *B32B 2439/62* (2013.01); *B32B 2553/02* (2013.01)

(58) Field of Classification Search
CPC ............ B32B 2255/10; B32B 2255/12; B32B 2255/26; B32B 2264/303; B32B 2305/30; B32B 2307/56; B32B 2310/0454; B32B 2310/0825; B32B 2323/04; B32B 2331/04; B32B 2439/06; B32B 2439/46; B32B 2439/62; B32B 2553/02; B65D 81/03
See application file for complete search history.

(56) References Cited

U.S. PATENT DOCUMENTS

| | | |
|---|---|---|
| 3,152,749 A | 10/1964 | Young |
| 3,252,064 A | 5/1966 | Duncan |
| 3,253,064 A | 5/1966 | Buonaiuto |
| 3,300,360 A | 1/1967 | Williams et al. |
| 3,342,613 A | 9/1967 | Schelhom |
| 3,401,475 A | 9/1968 | Morehouse et al. |
| 3,563,851 A | 2/1971 | Armour et al. |
| 3,583,851 A | 6/1971 | Harrington et al. |
| 3,615,972 A | 10/1971 | Morehouse, Jr. et al. |
| 3,732,975 A | 5/1973 | Poncy |
| 3,904,429 A | 9/1975 | Eastman et al. |
| 4,005,033 A | 1/1977 | Georgeau et al. |
| 4,006,273 A | 2/1977 | Wolinski et al. |
| 4,038,762 A | 8/1977 | Swan, Jr. |
| 4,087,002 A | 5/1978 | Bambara et al. |
| 4,094,685 A | 6/1978 | Lester et al. |
| 4,193,499 A | 3/1980 | Lockholder |
| 4,350,788 A | 9/1982 | Shimokawa et al. |
| 4,483,889 A | 11/1984 | Andersson |
| 4,531,038 A | 7/1985 | Lillibridge |
| 4,661,401 A | 4/1987 | Akao |
| 4,690,843 A | 9/1987 | Inagaki |
| 4,708,896 A | 11/1987 | Akao |
| 4,720,410 A | 1/1988 | Lundquist et al. |
| 4,900,594 A | 2/1990 | Quick |
| 4,925,711 A | 5/1990 | Akao et al. |
| 5,030,302 A | 7/1991 | Jud et al. |
| 5,082,744 A | 1/1992 | Akao et al. |
| 5,100,721 A | 3/1992 | Akao |
| 5,114,509 A | 5/1992 | Johnston et al. |
| 5,236,977 A | 8/1993 | Eden et al. |
| 5,264,467 A | 11/1993 | DiStefano |
| 5,277,737 A | 1/1994 | Li et al. |
| 5,325,781 A | 7/1994 | Dupont et al. |
| 5,342,467 A | 8/1994 | Corey |
| 5,356,683 A | 10/1994 | Egolf et al. |
| 5,387,626 A | 2/1995 | Boehme-Kovac et al. |
| 5,393,336 A | 2/1995 | Foran et al. |
| 5,451,437 A | 9/1995 | Insley et al. |
| 5,542,599 A | 8/1996 | Sobol |
| 5,636,493 A | 6/1997 | Weder |
| 5,685,480 A | 11/1997 | Choi |
| 5,759,624 A | 6/1998 | Neale et al. |
| 5,881,883 A | 3/1999 | Siegelman |
| 5,928,741 A | 7/1999 | Andersen et al. |
| 6,139,961 A | 10/2000 | Blankenship et al. |
| 6,231,970 B1 | 5/2001 | Andersen et al. |
| 6,255,369 B1 | 7/2001 | Philbin et al. |
| 6,312,713 B1 | 11/2001 | Korol et al. |
| 6,352,769 B1 | 3/2002 | Mori |
| 6,379,497 B1 | 4/2002 | Sandstrom et al. |
| 6,648,955 B1 | 11/2003 | Swiezkowski et al. |
| 6,740,373 B1 | 5/2004 | Swoboda et al. |
| 6,740,706 B2 | 6/2004 | Skryniarz et al. |
| 6,749,705 B2 | 6/2004 | Skrzyniarz et al. |
| 6,838,187 B2 | 1/2005 | Figiel et al. |
| 7,335,279 B2 | 2/2008 | Mohan et al. |
| 7,799,968 B2 | 9/2010 | Chen et al. |
| 8,529,723 B2 | 9/2013 | Fu et al. |
| 8,568,283 B2 | 10/2013 | Broering et al. |
| 8,574,698 B2 | 11/2013 | Fung et al. |
| 8,747,603 B2 | 6/2014 | Huang et al. |
| 9,056,712 B2 | 6/2015 | Cook et al. |
| 9,260,633 B2 | 2/2016 | Hoa et al. |
| 9,273,230 B2 | 3/2016 | Huang et al. |
| 9,522,772 B2 | 12/2016 | Fu et al. |
| 9,580,228 B2 | 2/2017 | Fu et al. |
| 9,580,629 B2 | 2/2017 | Huang et al. |
| 9,591,937 B2 | 3/2017 | Fu et al. |
| 9,648,969 B2 | 5/2017 | Fu et al. |
| 9,657,200 B2 | 5/2017 | Huang et al. |
| 9,771,499 B2 | 9/2017 | Huang et al. |
| 9,849,655 B2 | 12/2017 | Huang et al. |
| 9,865,551 B2 | 1/2018 | Takano et al. |
| 10,099,459 B2 | 10/2018 | Huang et al. |
| 10,100,204 B2 | 10/2018 | Huang et al. |
| 10,100,231 B2 | 10/2018 | Huang et al. |
| 10,144,573 B2 | 12/2018 | Fu et al. |
| 10,183,458 B2 | 1/2019 | Fu et al. |
| 10,208,429 B2 | 2/2019 | Huang et al. |
| 10,815,397 B2 | 10/2020 | Huang et al. |
| 11,193,048 B2 | 12/2021 | Huang et al. |
| 11,427,963 B2 | 8/2022 | Huang et al. |
| 2001/0049007 A1 | 12/2001 | Jones |
| 2002/0068139 A1 | 6/2002 | Polak et al. |
| 2002/0071947 A1 | 6/2002 | Soane et al. |
| 2002/0094403 A1 | 7/2002 | Ishikawa et al. |
| 2002/0115785 A1 | 8/2002 | Weitzel et al. |
| 2002/0182347 A1 | 12/2002 | DeBraal et al. |
| 2003/0003197 A1 | 1/2003 | Berlin et al. |
| 2003/0034117 A1 | 2/2003 | Thomas et al. |
| 2004/0033343 A1 | 2/2004 | Comeau et al. |
| 2004/0191438 A1 | 9/2004 | Cosentino et al. |
| 2004/0265539 A1* | 12/2004 | Hashimoto ............ C08J 7/046 428/141 |
| 2005/0067095 A1* | 3/2005 | Hasenoehrl ............ B32B 7/12 156/276 |
| 2005/0163974 A1 | 7/2005 | Geeroms |
| 2007/0009723 A1 | 1/2007 | Ogawa et al. |
| 2007/0155859 A1 | 7/2007 | Song et al. |
| 2007/0224395 A1 | 9/2007 | Rowitsch et al. |
| 2007/0228134 A1 | 10/2007 | Cook et al. |
| 2007/0287776 A1 | 12/2007 | Nordin et al. |
| 2008/0017338 A1 | 1/2008 | Nordin et al. |

(56) References Cited

U.S. PATENT DOCUMENTS

| | | |
|---|---|---|
| 2008/0055380 A1 | 3/2008 | Regan et al. |
| 2008/0118693 A1 | 5/2008 | Bilski et al. |
| 2009/0280322 A1 | 11/2009 | Daniels et al. |
| 2009/0306255 A1 | 12/2009 | Patel et al. |
| 2009/0321508 A1 | 12/2009 | Fu et al. |
| 2010/0012712 A1 | 1/2010 | Swoboda et al. |
| 2010/0068544 A1 | 3/2010 | Huang et al. |
| 2010/0119741 A1 | 5/2010 | Cimecioglu et al. |
| 2010/0136269 A1 | 6/2010 | Andersen et al. |
| 2010/0139878 A1 | 6/2010 | Nicolucci |
| 2010/0181015 A1 | 7/2010 | Kohler |
| 2011/0019121 A1 | 1/2011 | Mo et al. |
| 2011/0033398 A1 | 2/2011 | Gauvin et al. |
| 2011/0064926 A1 | 3/2011 | Babinsky et al. |
| 2011/0248076 A1 | 10/2011 | Bentmar et al. |
| 2012/0015162 A1 | 1/2012 | Lion et al. |
| 2012/0043373 A1 | 2/2012 | Babinsky et al. |
| 2012/0048450 A1 | 3/2012 | Fu et al. |
| 2012/0100289 A1 | 4/2012 | Egan et al. |
| 2013/0160945 A1 | 6/2013 | Huang et al. |
| 2013/0303351 A1 | 11/2013 | Fu et al. |
| 2014/0087109 A1 | 3/2014 | Huang et al. |
| 2014/0087177 A1* | 3/2014 | Huang ............... D21H 17/57 428/323 |
| 2014/0131367 A1 | 5/2014 | Bordary et al. |
| 2014/0141185 A1 | 5/2014 | Huang et al. |
| 2014/0154492 A1 | 6/2014 | Traser et al. |
| 2014/0243442 A1 | 8/2014 | Coles et al. |
| 2015/0322301 A1 | 11/2015 | Ellis et al. |
| 2016/0050722 A1 | 2/2016 | Fu et al. |
| 2016/0263876 A1 | 9/2016 | Huang et al. |
| 2017/0130058 A1 | 5/2017 | Huang et al. |
| 2017/0130399 A1 | 5/2017 | Huang et al. |
| 2017/0361573 A1* | 12/2017 | Malmgren ............ D21H 21/54 |
| 2018/0148246 A1 | 5/2018 | Fu et al. |
| 2019/0031415 A1 | 1/2019 | Kumar |
| 2019/0062028 A1 | 2/2019 | Getty et al. |
| 2019/0284438 A1 | 3/2019 | McLeod et al. |
| 2019/0106263 A1 | 4/2019 | Fu et al. |
| 2019/0136456 A1 | 5/2019 | Huang et al. |
| 2019/0152183 A1 | 5/2019 | Fu et al. |
| 2019/0218419 A1 | 7/2019 | McLeod et al. |
| 2019/0218429 A1 | 7/2019 | Huang et al. |
| 2019/0218720 A1 | 7/2019 | Huang et al. |
| 2020/0247105 A1 | 8/2020 | Getty et al. |
| 2021/0214581 A1 | 7/2021 | McLeod et al. |
| 2022/0073787 A1 | 3/2022 | McLeod et al. |

FOREIGN PATENT DOCUMENTS

| | | |
|---|---|---|
| CA | 2078476 A1 | 5/1997 |
| CN | 1354085 A | 6/2002 |
| CN | 1449913 A | 10/2003 |
| CN | 1643100 A | 7/2005 |
| CN | 101263184 A | 9/2008 |
| CN | 101476265 A | 7/2009 |
| CN | 103079791 A | 5/2013 |
| CN | 103189460 A | 7/2013 |
| CN | 103717690 A | 4/2014 |
| CN | 104685125 A | 6/2015 |
| CN | 105765023 A | 7/2016 |
| DE | 3685819 T2 | 1/1993 |
| DE | 60107070 T2 | 11/2005 |
| DE | 202011109020 U1 | 3/2012 |
| EP | 0526396 A1 | 2/1993 |
| EP | 0890625 A1 | 1/1999 |
| EP | 1142801 A1 | 10/2001 |
| EP | 1216146 B1 | 10/2005 |
| EP | 1634897 A2 | 3/2006 |
| EP | 1669490 A1 | 6/2006 |
| EP | 1674543 A1 | 6/2006 |
| EP | 1780250 A1 | 5/2007 |
| EP | 3672805 A1 | 7/2020 |
| JP | S6144965 A | 3/1986 |
| JP | H05208597 A | 8/1993 |
| JP | H05239423 A | 9/1993 |
| JP | H06313163 A | 11/1994 |
| JP | H08175576 A | 7/1996 |
| JP | H09164621 A | 6/1997 |
| JP | H09217050 A | 8/1997 |
| JP | H10329297 A | 12/1998 |
| JP | 2000006285 A | 1/2000 |
| JP | 2000159268 A | 6/2000 |
| JP | 2001191436 A | 7/2001 |
| JP | 2001207146 A | 7/2001 |
| JP | 2002241450 A | 8/2002 |
| JP | 2003154589 A | 5/2003 |
| JP | 2004511616 A | 4/2004 |
| JP | 2005097816 A | 4/2005 |
| JP | 2010202996 A | 9/2010 |
| JP | 2013067070 A | 4/2013 |
| KR | 20140090995 A | 7/2014 |
| RU | 2216495 C2 | 11/2003 |
| RU | 2252825 C2 | 5/2005 |
| RU | 2011129597 A | 1/2013 |
| RU | 2519451 C2 | 6/2014 |
| RU | 2015135327 A | 3/2017 |
| WO | 9014223 A1 | 11/1990 |
| WO | 9854004 A1 | 12/1998 |
| WO | 0069747 A1 | 11/2000 |
| WO | 0110635 A3 | 2/2001 |
| WO | 0154828 A1 | 8/2001 |
| WO | 0154988 A2 | 8/2001 |
| WO | 200162986 A1 | 8/2001 |
| WO | 0200800 A2 | 1/2002 |
| WO | 0231077 A2 | 4/2002 |
| WO | 2005110737 A1 | 11/2005 |
| WO | 2007091961 A1 | 8/2007 |
| WO | 2007126783 A1 | 11/2007 |
| WO | 2007135451 A1 | 11/2007 |
| WO | 2007142593 A1 | 12/2007 |
| WO | 2008084372 A1 | 7/2008 |
| WO | 2010069451 A1 | 6/2010 |
| WO | 2010129493 A1 | 11/2010 |
| WO | 2012030596 A2 | 3/2012 |
| WO | 2012033998 A2 | 3/2012 |
| WO | 2014015060 A2 | 1/2014 |
| WO | 2014051876 A1 | 4/2014 |
| WO | 2015036901 A1 | 3/2015 |
| WO | 2015081097 A1 | 6/2015 |
| WO | 2016014486 A1 | 1/2016 |
| WO | 2019018523 A1 | 1/2019 |
| WO | 2019040624 A1 | 2/2019 |

OTHER PUBLICATIONS

Bermesheva, Ev "Zavisimost mezhdu vyazkoupru9imi l adgezivnymi svoistvami polimemykh adgezivov. Dopolneni kriteriya liplosti Dalkkuista", 25 Sipozium Po Reologii, G.Ostashkov, Sep. 5-10, 2010, pp. 61, 62.

Radio frequency (RF)vs, microwave (MW) (n.d.), Retrieved from https://www.stalam.com/eng/technology?and-benefits/rf-vs-microwaves.

Jiao, Shunshan et al., "Principles of Radio-Frequency and Microwave Heating", Radio-Frequency Heating in Food Processing, CRC Press, 2015, p. 4. Month of Publication Unknown. (Year: 2015).

NXP, FTF 2016 Technology Forum, "Advantages of Solid State RF Power Over Vacuum Tubes in Industrial Applications", May 18, 2016. (Year: 2016).

Skylighter, "Kraft Paper Weights and Thickness Comparison Chart", Feb. 14, 2018. (Year: 2018).

European Search Results Under Rule 164(2)(b) EPC EO 18769557 Completed: May 27, 2021; dated Jun. 2, 2021 7 Pages.

International Search Report and Written Opinion, International Application No. PCT/US2018/047526, dated Jan. 18, 2019.

* cited by examiner

__US 11,833,788 B2__

METHOD FOR PRODUCING A MULTI-LAYER SUBSTRATE

FILED OF THE INVENTION

The present invention relates to a method for producing a multi-layer substrate, said substrate comprising a multifunctional coating, and to the use of the substrate produced by this method.

The Internet as a distribution channel for goods of all kinds has become increasingly important in recent years. Clothing, electronics, computers and shoes make up the largest share of goods sold on the Internet, but household goods, furniture and interior furnishings as well as everyday goods such as food, drugstore items and pet supplies are increasingly being purchased via the Internet. In order for the goods to reach the customer, not only complex logistics are required, but also safe transport so that sensitive or fragile goods arrive at the customer without damage.

BACKGROUND OF THE INVENTION

Safe packaging of the goods can be achieved, for example, with the aid of suitable packaging material, the packaging material generally having a type of padding by which the goods to be transported are protected. A classic example of such a packaging material is an air cushion film, that is to say a plastic film which has pockets filled with air, by means of which mechanical vibrations can be cushioned. However, these bubble wrap films have the disadvantage that they are usually made from petroleum-based plastics and their production and disposal involve major ecological interventions. This problem is exacerbated in view of the increasing need and the increasing desire for sustainability. There is therefore a need for alternative packaging materials that have the same properties but show better environmental compatibility.

WO 2014/051876 describes an adhesive composition which is used for producing packaging materials, the adhesive composition having microspheres which have an insulating effect.

DE 20 2011109 020 describes a composite body consisting of a carrier substrate made of natural fibers and at least one bonded substrate layer made of a flexible film-shaped substrate, which are completely bonded to a dried adhesive layer, the adhesive layer being produced from an aqueous foamed adhesive.

WO 2010/129493 discloses an inflatable mailing bag that has an inflatable liner and a connector through which the liner can be inflated.

The materials described in the prior art are generally only accessible through complex production processes, as a result of which the amount that can be produced is limited. Furthermore, the conventional materials have the disadvantage that they have a large volume due to the cushion layer introduced, which can cause high costs, in particular when the material is transported and stored.

BRIEF SUMMARY OF THE INVENTION

The object of the present invention is therefore to provide a method which allows the production of a packaging material which can absorb mechanical shocks and can be easily stored and transported.

It has surprisingly been found that this object is achieved by a method for producing a multi-layer substrate which has a multifunctional coating.

A first object of the present invention is therefore a method for producing a multi-layer substrate comprising the following steps:
a) Providing a first material having a first surface with at least one edge region and at least one inner region enclosed by the edge region;
b) Applying a coating material to the inner region of the first surface, the coating material comprising expandable microparticles;
c) Drying the coating material;
d) Contacting the first surface of the first material with a surface of a second material to form the multi-layer substrate such that the coating material is between the first material and the second material.

It has surprisingly been found that a substrate with a small volume is accessible in this way. The method according to the invention is further characterized in that it allows the substrate to be produced in large quantities and can be carried out without the need for complex modifications to the device used.

In a preferred embodiment, the first material has more than one inner region.

The coating material is preferably applied over the entire surface. For the purposes of the present invention, this is to be understood to mean application in such a way that the entire inner region is covered with the coating material. In order to save costs and material, it can be advantageous to apply the coating material intermittently or only partially, so that the inner region is not completely covered. An alternative embodiment is therefore preferred, in which the coating material is partially applied to the inner region.

In a preferred embodiment, the contacting of the first and the second material takes place using an adhesive. The adhesive is preferably applied to the edge region of the first surface before the contacting of the first and the second material. The adhesive is particularly preferably applied uniformly or continuously to the edge region of the first surface, so that the edge region is completely covered with the adhesive. It has surprisingly been found that the composite adhesion of the materials in the substrate can be improved in this way without the performance of the coating material being impaired. The advantages of the method according to the invention come to full development when it is ensured that no adhesive gets onto the inner region.

In a preferred embodiment of the method according to the invention, the first and the second material are provided in the form of continuous webs. In an alternative preferred embodiment, the first material is divided into individual units before or after application of the coating material, which have an edge region and an inner region enclosed by the edge region. In an alternative preferred embodiment, the division of the first material and the application of the coating material to the inner region take place simultaneously. In terms of process technology, the cutting is combined with the application of the coating material and is preferably carried out in a combined step.

In a preferred embodiment, the first material is selected from the group consisting of material based on cellulose, plastic and metal. The first material can have synthetic fibers, for example, in order to increase the stability of the material.

The first material is particularly preferably a material based on cellulose. In particular, the first material is selected from the group consisting of paper, cardboard and coated paper.

In a preferred embodiment, the second material is selected from the group consisting of material based on cellulose, plastic and metal. The second material can have synthetic fibers, for example, in order to increase the stability of the material.

The second material is particularly preferably a material based on cellulose. In particular, the second material is selected from the group consisting of paper, cardboard and coated paper.

In a preferred embodiment, the first and second materials are paper. The second material is particularly preferably present in the form of a continuous web.

DETAILED DESCRIPTION OF THE INVENTION

Figure 1:
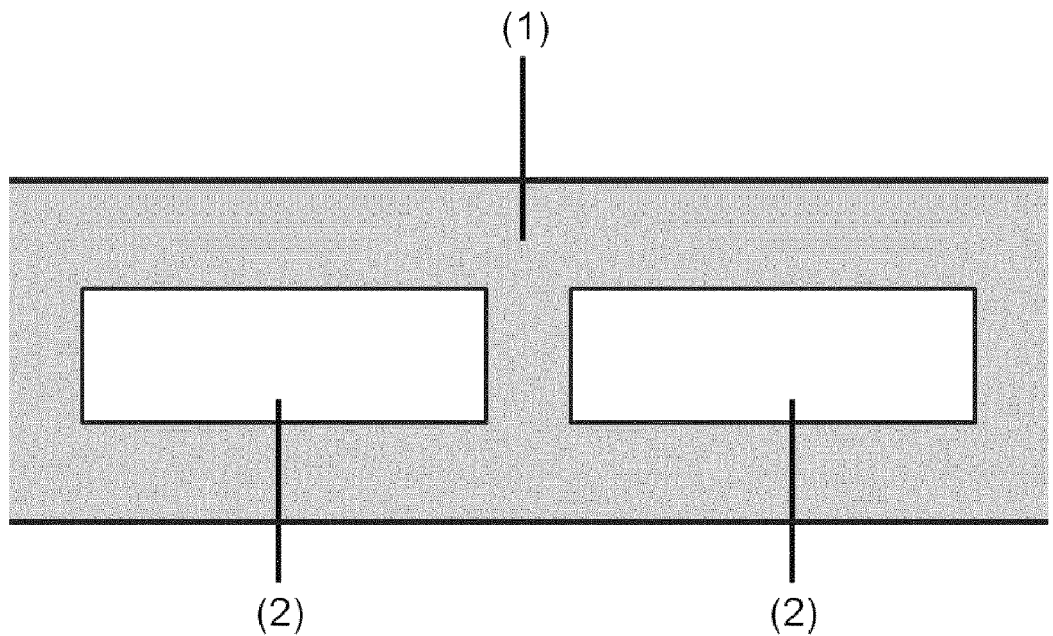
FIG. 1 shows schematically the first material in the form of a continuous web, wherein (1) denotes the edge region and (2) the inner region.

The method according to the invention is distinguished by its rapid process control, which allows large quantities of the multi-layer substrate to be produced in a short time. This is achieved, among other things, by carefully coordinating the properties of the materials used. Therefore, an embodiment of the present invention is preferred in which the drying of the coating material is carried out at a temperature of 80° C. or less, preferably at a temperature of 40° C. to 75° C. It has surprisingly been found that rapid drying is achieved at these temperatures without the performance of the coating material being impaired, as a result of which the process throughput is improved.

The best results in terms of process throughput were achieved when a polymer-based coating material was used. An embodiment is therefore preferred in which the coating material is a polymer-based coating material which has 10 to 40 wt. %, preferably 15 to 35 wt. % of expandable microparticles, in each case based on the total weight of the coating material. It has surprisingly been found that such a coating material can be applied at a high speed, but at the same time has sufficient stability so that it does not run after application.

The coating material used in the method according to the invention has expandable microparticles. The microparticles preferably have a particle size, expressed as a D50 value, of 5 to 18 μm, preferably 10 to 17 μm, in the unexpanded state.

The expandable microparticles are preferably thermally expandable microparticles, which preferably have the shape of spheres.

In a preferred embodiment of the method according to the invention, the multi-layer substrate is converted into packaging in a further step. This implementation can take place, for example, by cutting and folding the multi-layer substrate. The packaging is preferably an envelope, a mailing bag, a bag, a carrier bag, a pouch or a carton, the format and size being variable. In a particularly preferred embodiment, the packaging is a mailing bag.

In a preferred embodiment, the method according to the invention comprises a further step in which the multi-layer substrate is subjected to a treatment for expanding the expandable microparticles.

In a preferred embodiment, the heat treatment step follows step d) of the method according to the invention.

The method according to the invention allows the production of a substrate, the volume of which can be increased by a heat treatment, wherein this heat treatment can be carried out independently of the production method. In a preferred embodiment, the heat treatment is carried out separately from the other method steps in terms of time and/or location. In this way it is possible to transport and store the substrate in the state of a small volume. The substrate reaches its final volume as a result of the heat treatment, which causes the microparticles of the coating material to expand. The method according to the invention makes it possible to carry out the heat treatment only shortly before the substrate is used, which was not possible with conventional methods described in the prior art. For example, the substrate can be further processed into a mailing bag, which takes up little space due to the small volume and the small thickness. Before the mailing bag is used, it can be subjected to a heat treatment, whereby the microparticles are expanded and the mailing bag develops its desired cushioning effect. In this way, valuable storage and transport capacity can be saved by the method according to the invention.

The heat treatment is preferably carried out at temperatures from 85° C. to 150° C., preferably 90 to 140° C. This ensures that the microparticles fully expand without being damaged and without losing their shock-absorbing effect.

In order to achieve optimal absorption of mechanical influences, it has proven to be advantageous if the microparticles in the expanded state have a particle size in the range from 20 μm to 200 μm. An embodiment is therefore preferred in which the microparticles in the expanded state have a particle size, expressed as a D50 value, of 20 μm to 200 μm, preferably 20 to 150 μm.

The heat treatment is preferably carried out using conventional heat sources. The heat treatment is particularly preferably carried out using infrared radiation and/or warm air.

The multi-layer substrate produced by the method according to the invention is distinguished by its flexible volume. Another object of the present invention is therefore a multi-layer substrate which can be obtained by the method according to the invention. The substrate according to the invention is preferably in the form of a continuous web. In an alternative preferred embodiment, the substrate according to the invention is in the form of a packaging, preferably in the form of an envelope, a mailing bag, a bag, a carrier bag, a pouch or a carton, the format and the size being variable.

The substrate according to the invention can be easily processed into packaging. Another object is therefore a method for producing a package using a multi-layer substrate which has been produced by the method according to the invention, the multi-layer substrate being formed into a package by means of cutting and folding.

Another object of the present application is a package obtainable according to the inventive method. The packaging is preferably an envelope, a mailing bag, a bag, a carrier bag, a pouch or a carton, the format and the size being variable.

The present invention is to be explained in more detail with reference to the following example, which is in no way to be understood as a restriction of the inventive concept.

A suitable coating material can contain 30 to 70 wt-% of VAE copolymer dispersion (Vinamul® 3928), 5 to 15 wt. % of paraffin dispersion (Michemlube® 743 PE), 15 to 30 wt. % of microparticles (Expancel® 031 WUF 40), 5 to 10 wt. % of glycerol and optionally up to a wt. % of hydroxyethylcellulose (MEHC, Natrosol® 250LR), wherein the weight percentages refer to the total weight of the coating material and add up to 100 wt. %.

FIG. 1 shows schematically the first material in the form of a continuous web, wherein (1) denotes the edge region and (2) the inner region.

Figure 2:
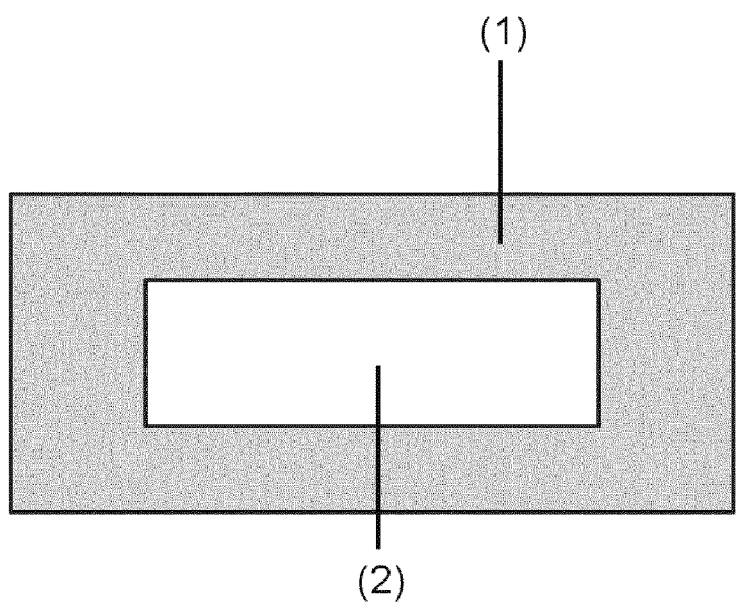
FIG. 2 shows schematically the first material in the form of a single unit, wherein (1) denotes the edge region and (2) the inner region.

FIG. 2 shows schematically the first material in the form of a single unit, wherein (1) denotes the edge region and (2) the inner region.

The invention claimed is:

1. A method of producing a multi-layer substrate comprising the following steps:
   a) providing a first material having a first surface with at least one edge region and at least one inner region enclosed by the edge region;
   b) applying a coating material to partial portions of the inner region of the first surface, the coating material comprising expandable microparticles;
   c) drying the coating material; and
   d) contacting the first surface of the first material with a surface of a second material to form the multi-layer substrate such that the coating material is between the first material and the second material,
   wherein the inner region does not contain an adhesive
   wherein the coating material consists of:
      (i) 30 to 70 wt-% of VAE copolymer dispersion;
      (ii) 5 to 15 wt. % of paraffin dispersion;
      (iii) 15 to 30 wt. % of microparticles;
      (iv) 5 to 10 wt. % of glycerol; and
      (v) optionally, hydroxyethylcellulose,
      wherein the total weight of the coating material and add up to 100 wt. %.

2. The method according to claim 1, characterized in that the contacting in step d) is carried out using an adhesive, wherein the adhesive is applied continuously to the edge region of the first material.

3. The method according to claim 1, characterized in that the coating material is dried at a temperature of 80° C. or less.

4. The method according to claim 1, characterized in that the coating material is a polymer-based coating material which has 10 to 40 wt. %, of expandable microparticles based on the total weight of the coating material.

5. The method according to claim 4, characterized in that the expandable microparticles are thermally expandable microparticles.

6. The method according to claim 1, characterized in that the multi-layer substrate is converted into a packaging in a further step.

7. The method according to claim 6, characterized in that the packaging is an envelope, a mailing bag, a bag, a carrier bag, a pouch or a carton.

8. The method according to claim 1, characterized in that the method comprises a further step e) in which the multi-layer substrate is subjected to a treatment for expanding the expandable microparticles.

9. The method according to claim 8, characterized in that the treatment is a heat treatment carried out at a temperature of 85° C. to 150° C.

10. The method according to claim 8, characterized in that the treatment is carried out separately from the other method steps from time and/or location.

11. The method according to claim 8, characterized in that the treatment is a heat treatment which is carried out using infrared radiation and/or warm air.

12. A method of producing a package using a multi-layer substrate produced by a method according to claim 1, wherein the multi-layer substrate is formed into the package by cutting and folding.

* * * * *